(12) United States Patent
Sadana et al.

(10) Patent No.: US 10,352,133 B2
(45) Date of Patent: Jul. 16, 2019

(54) HIGH TEMPERATURE HYDROPHOBIC CHEMICAL RESISTANT COATING FOR DOWNHOLE APPLICATIONS

(71) Applicants: Anil Sadana, Houston, TX (US); Vipul Mathur, Houston, TX (US); James Edward Goodson, Porter, TX (US); John C. Welch, Spring, TX (US)

(72) Inventors: Anil Sadana, Houston, TX (US); Vipul Mathur, Houston, TX (US); James Edward Goodson, Porter, TX (US); John C. Welch, Spring, TX (US)

(73) Assignee: BAKER HUGHES, A GE COMPANY, LLC, Houston, TX (US)

( * ) Notice: Subject to any disclaimer, the term of this patent is extended or adjusted under 35 U.S.C. 154(b) by 252 days.

(21) Appl. No.: 14/931,916

(22) Filed: Nov. 4, 2015

(65) Prior Publication Data

US 2017/0122073 A1   May 4, 2017

(51) Int. Cl.
*E21B 41/00* (2006.01)
*C09D 165/04* (2006.01)

(52) U.S. Cl.
CPC ............ *E21B 41/00* (2013.01); *C09D 165/04* (2013.01); *C08G 2261/146* (2013.01); *C08G 2261/3424* (2013.01); *C08G 2261/598* (2013.01); *C08G 2261/62* (2013.01)

(58) Field of Classification Search
CPC ......... E21B 41/00; E21B 43/00; C23C 16/56; C23C 18/02
See application file for complete search history.

(56) References Cited

U.S. PATENT DOCUMENTS

| 5,976,437 | A | 11/1999 | Marrocco, III et al. |
| 6,129,360 | A | 10/2000 | Walker et al. |
| 6,284,050 | B1 * | 9/2001 | Shi ............................ B05D 1/60 118/715 |
| 7,390,317 | B2 | 6/2008 | Taylor et al. |
| 7,396,538 | B2 | 7/2008 | Granada et al. |
| 7,455,106 | B2 * | 11/2008 | Veneruso .............. E21B 43/128 166/242.1 |
| 8,070,828 | B2 | 12/2011 | Shannon et al. |
| 8,211,791 | B2 | 7/2012 | Lin et al. |

(Continued)

FOREIGN PATENT DOCUMENTS

| EP | 1814480 | 8/2007 |
| EP | 2305148 | 4/2011 |

(Continued)

OTHER PUBLICATIONS

Quere et al., "Non-adhesive lotus and other hydrophobic materials", Philosophical Transactions of the Royal Society A, 366, 1539-1556 (2008).

(Continued)

*Primary Examiner* — David J Bagnell
*Assistant Examiner* — Manuel C Portocarrero
(74) *Attorney, Agent, or Firm* — Cantor Colburn LLP

(57) ABSTRACT

A downhole article comprises a polymer substrate having a surface that is configured for exposure to a well fluid; the substrate comprising a thermoplastic material, an elastomer, or a combination comprising at least one of the foregoing; and a coating disposed on the surface of the polymer substrate; the coating comprising a fluorinated poly-para-xylylene.

14 Claims, 8 Drawing Sheets

(56) References Cited

U.S. PATENT DOCUMENTS

| | | |
|---|---|---|
| 8,604,157 B2 | 12/2013 | Gerrard et al. |
| 8,929,119 B2 | 1/2015 | Lee et al. |
| 8,939,222 B2 | 1/2015 | Ren et al. |
| 9,120,898 B2 | 9/2015 | Ren et al. |
| 9,144,925 B2 | 9/2015 | Ren et al. |
| 2007/0142547 A1* | 6/2007 | Vaidya et al. ............ C08K 3/04 524/847 |
| 2010/0019456 A1* | 1/2010 | Gerrard .................. E21B 33/10 277/336 |
| 2010/0126723 A1* | 5/2010 | Ali ........................ C09K 8/508 166/281 |
| 2013/0237744 A1 | 9/2013 | Pfeffer et al. |
| 2014/0076063 A1 | 3/2014 | Lisseman et al. |
| 2014/0370217 A1 | 12/2014 | Perez et al. |
| 2015/0060072 A1* | 3/2015 | Busby ..................... C09K 8/90 166/294 |
| 2015/0090456 A1* | 4/2015 | Turkenburg ............. G01V 9/00 166/305.1 |
| 2015/0152309 A9* | 6/2015 | Harrison .................. C09K 5/10 252/67 |

FOREIGN PATENT DOCUMENTS

| | | |
|---|---|---|
| WO | 2005059430 A1 | 6/2005 |
| WO | 2010009182 A2 | 1/2010 |
| WO | 2013037005 A1 | 3/2013 |
| WO | 2014043664 A1 | 3/2014 |

OTHER PUBLICATIONS

International Search Report, International Application No. PCT/US2016/059919, dated Jan. 17, 2017, Korean Intellectual Property Office; International Search Report 5 pages.

International Written Opinion, International Application No. PCT/US2016/059919, dated Jan. 17, 2017, Korean Intellectual Property Office; Written Opinion 6 pages.

* cited by examiner

Uncoated filled PEEK after aging

Uncoated filled PEEK after aging

HIGH TEMPERATURE HYDROPHOBIC CHEMICAL RESISTANT COATING FOR DOWNHOLE APPLICATIONS

BACKGROUND

A downhole environment such as an oil or gas well in an oilfield or undersea formations may expose equipment used downhole to severe conditions of temperature, pressure, or corrosiveness. These challenging conditions may affect the integrity or performance of the equipment. For example, where an article has a rubber or plastic part, environmental conditions can cause corrosion by contact with hydrocarbon oil, water, inorganic salts, acids, hydrogen sulfide, carbon dioxide, or other corrosive materials found in such environments. This contact can weaken the structural integrity of the element or cause the element to have poor dimensional stability.

Advances in methods and materials to ameliorate environmental effects on downhole articles are well received by the industry.

BRIEF DESCRIPTION

A downhole article comprises a polymer substrate having a surface that is configured for exposure to a well fluid; the substrate comprising a thermoplastic material, an elastomer, or a combination comprising at least one of the foregoing; and a coating disposed on the surface of the polymer substrate; the coating comprising a fluorinated poly-para-xylylene.

A method of protecting an article from a downhole environment comprises depositing a fluorinated poly-para-xylylene coating on a surface of a polymer substrate to provide a coated article; the surface of the polymer substrate configured for exposure to a well fluid; and the polymer substrate comprising a thermoplastic material, an elastomer, or a combination comprising at least one of the foregoing; wherein the downhole environment comprises one or more of the following: a brine; a hydrocarbon; or an elevated temperature up to about 670° F.

BRIEF DESCRIPTION OF THE DRAWINGS

The following descriptions should not be considered limiting in any way. With reference to the accompanying drawings, like elements are numbered alike.

DETAILED DESCRIPTION

Figure 1:
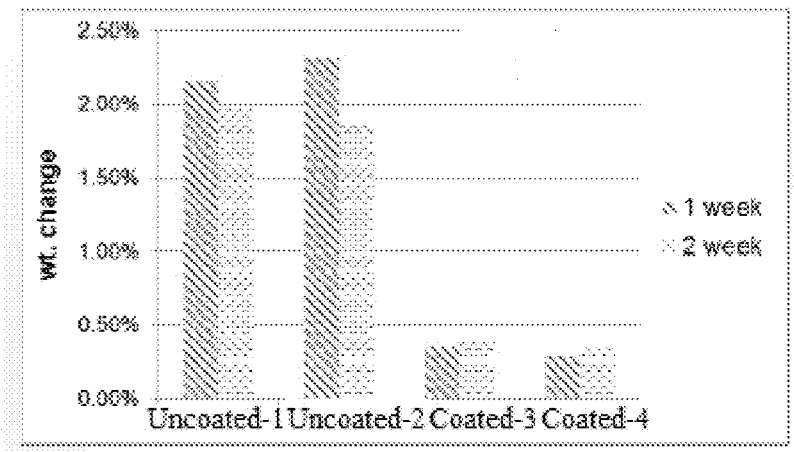
FIG. 1 shows the weight percent changes of uncoated glass filled polyetheretherketone (PEEK) samples and coated glass filled PEEK samples having a fluorinated poly-para-xylylene coating after exposing to 19.2 pounds per gallon (ppg) HYCAL III (zinc bromide/calcium bromide, pH=1.42) at 500° F. for one or two weeks.

It has been found that a fluorinated poly-para-xylylene coating disposed on a surface of a substrate configured to be exposed to a well fluid has advantageous material properties that protect the substrate from deterioration or changes due to a local environmental condition, particularly due to exposure to heavy brines such as zinc bromide. The fluorinated poly-para-xylylene coating forms without defects on various thermoplastic and elastomer substrates. Moreover, the fluorinated poly-para-xylylene coating having superior properties such as chemical resistance, barrier properties to fluids (gas or liquid), substrate adhesion, retention of mechanical properties at elevated temperatures, scratch resistance, and high resilience to peeling from a substrate.

In an embodiment, there is provided an article comprising a polymeric substrate having a surface that is configured for exposure to a well fluid; and a coating disposed on the surface of the substrate; the coating comprising a fluorinated poly-para-xylylene.

The polymeric substrate can comprise a thermoplastic polymer, an elastomer, or a combination comprising at least one of the foregoing. The substrate can comprise a blend of polymers. The substrate can also comprise an oligomer, a homopolymer, a copolymer, or a combination comprising at least one of the foregoing.

Exemplary polymers in the polymer substrate include a polyaryletherketone, a fluoropolymer, a polyarylene sulfide such as a polyphenylene sulfide, a polyarylene such as a polyphenylene, a polyarylene sulfone such as a polyphenylsulfone, a polyether sulfone, a polyarylene ether, a polyurea, a polyurethane, a polycarbonate, a polyimide such as a polyetherimide, an ethylene-propylene-diene monomer rubber; a butadiene rubber; a styrene-butadiene rubber; a natural rubber; an acrylonitrile butadiene rubber; a styrene-butadiene-acrylonitrile resin; a butadiene-nitrile rubber; a polyisoprene rubber; an acrylate-butadiene rubber; a polychloroprene rubber; an acrylate-isoprene rubber; an ethylene-vinyl acetate rubber; a polypropylene oxide rubber; a crosslinked product thereof, or a combination comprising at least one of the foregoing.

The polyaryletherketone can have a repeat unit that includes a phenylene group, ether group, ketone group, derivatives thereof, or a combination thereof. The phenyl ring of the repeat unit can be substituted in an embodiment. Exemplary polyaryletherketone polymers include polyetherketone (PEK), polyetheretherketone (PEEK), polyetherketoneketone (PEKK), polyetheretherketoneketone (PEEKK), polyetherketoneetherketoneketone (PEKEKK), and the like.

In an embodiment, the polymer is a fluoropolymer. Exemplary fluoropolymer polymers include polytetrafluoroethylene (PTFE, available under the trade name Teflon from DuPont), polyethylenetetrafluoroethylene (ETFE, available under the trade name Teflon ETFE or Tefzel from DuPont), fluorinated ethylene propylene copolymer (FEP, available under the trade name Teflon FEP from DuPont), perfluoroalkoxy polymer (PFA, available under the trade name Teflon PFA from DuPont), polyvinylidene fluoride (PVDF, available under the trade name Hylar from Solvay Solexis S.p.A.), polyvinylfluoride (PVF, available under the trade name Tedlar from DuPont), polychlorotrifluoroethylene (PCTFE, available under the trade name Kel-F from 3M Corp. or Neoflon from Daikin), polyethylenechlorotrifluoroethylene (ECTFE, available under the trade name Halar ECTFE from Solvay Solexis S.p.A.), chlorotrifluoroethylenevinylidene fluoride (FKM fluorocarbon, available under the trade name Viton from FKM-Industries), perfluoroelastomer such as FFKM (available under the trade name Kalrez from DuPont), tetrafluoroethylene-propylene elastomeric copolymers such as those available under the trade name Aflas from Asahi Glass Co), perfluoropolyether (available under the trade name Krytox from DuPont), perfluorosulfonic acid (available under the trade name Nafion from DuPont), and the like. Other exemplary fluoropolymers include copolymers of vinylidene fluoride and hexafluoropropylene and terpolymers of vinylidene fluoride, hexafluoropropylene, and tetrafluoroethylene.

In another embodiment, the polymer substrate comprises a self-reinforced polyphenylene (SRP). SRP can have a repeat unit that includes 1,3-phenylene, benzoyl-1,4-phenylene, phenoxy-benzoyl-1,4-phenylene, derivatives thereof, or a combination thereof. The phenyl ring of the repeat unit can be substituted.

In one embodiment, the SRP is a copolymer of benzoyl-1,4-phenylene and 1,3-phenylene. This SRP can be made by a method described in U.S. Pat. No. 5,976,437, the disclosure of which is incorporated herein in its entirety.

In a particular embodiment, the polymer is a crosslinked polyphenylene sulfide (x-PPS), crosslinked polyphenylsulfone (x-PPSU), crosslinked self-reinforced polyphenylene (x-SRP), crosslinked polyethersulfone (x-PESU), or a combination comprising at least one of the foregoing. Consequently, in one embodiment, the crosslinked product includes a crosslink between, for example, x-PPS, x-PPSU, x-SRP, x-PESU, or a combination comprising at least one of the foregoing. Descriptions of x-PPS, x-PPSU, and x-SRP and processes for making each are described in U.S. Pat. Nos. 8,604,157, 8,929,119, 8,939,222, 9,120,898, and 9,144,925.

In another specific exemplary embodiment, the polymer is PEEK unfilled or filled with glass, crosslinked self-reinforced polyphenylene, a fluoropolymer, or a combination comprising at least one of the foregoing.

The polymer substrate can further comprise reinforcing and/or non-reinforcing additives. Reinforcing additives include, for example, silica, glass fiber, carbon fiber, or carbon black, which can be added to the polymers to increase strength of the substrate. Non-reinforcing additives include a pigment, dye, stabilizer, flow improver, plasticizer (e.g., glycols, C16-C22 fatty alcohols, C8-C22 fatty acids, phthalates, or phosphates), lubricant (e.g., graphene, titanium dioxide,), and the like. Nanofillers are also a useful additive and can be reinforcing or non-reinforcing. Certain additives such as calcium carbonate, talc, titanium oxide, silica, clay, barium sulfate, magnesium carbonate, or ceramic can be added to the polymers to attain an improvement in heat resistance, aging, or the like of the substrate.

Combinations comprising at least one of the foregoing additives can be used. The additive can be present in an amount up to 40 weight percent, specifically from 0.1 wt % to 25 wt %, more specifically 0.1 wt % to 15 wt %, and more specifically 0.1 wt % to 5 wt %, based on the weight of the substrate.

The substrate can be used without surface processing or can be processed, including chemically, physically, or mechanically treating the substrate. For example, the substrate can be treated to roughen or increase a surface area of the substrate, e.g., by sanding, lapping, or sand blasting. A surface of the substrate can also be cleaned to remove contaminants through chemical and/or mechanical means.

The substrate can be any shape. Exemplary shapes include a ring, cube, sphere, cylinder, toroid, polygonal shape, helix, truncated shape thereof, or a combination thereof. The longest linear dimension of the substrate can be from 500 nm to hundreds of meters, without limitation.

The coating comprises a fluorinated poly-para-xylylene. In an embodiment, the fluorinated poly-para-xylylene has a structural formula:

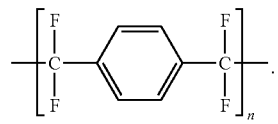

The fluorinated poly-para-xylylene can be deposited on the substrate by a pyrolytic deposition process. Such process begins with the vaporization of a precursor such as an octafluoro[2.2]paracyclophane, which is pyrolytically cleaved to form a reactive monomer vapor. The reactive monomer vapor condenses upon the desired substrates to form a fluorinated poly-para-xylylene coating.

The coating formed on the substrate can completely cover the substrate or a surface of the substrate. The thickness of the coating can be from about 5 μm to about 10 mm, specifically about 10 μm to about 1 mm, more specifically about 10 μm to about 0.1 mm. In an embodiment, the coating is continuous and does not have voids, microvoids, fractures, or other defects, including pinholes and the like.

The fluorinated poly-para-xylylene coatings can also have excellent chemical resistance at elevated temperatures. In an embodiment, the coatings resist swelling and degradation of properties when exposed to chemical agents, in particular heavy brines, hydrocarbons, and acids, at elevated temperatures of up to about 600° F. for prolonged periods.

Figure 2:
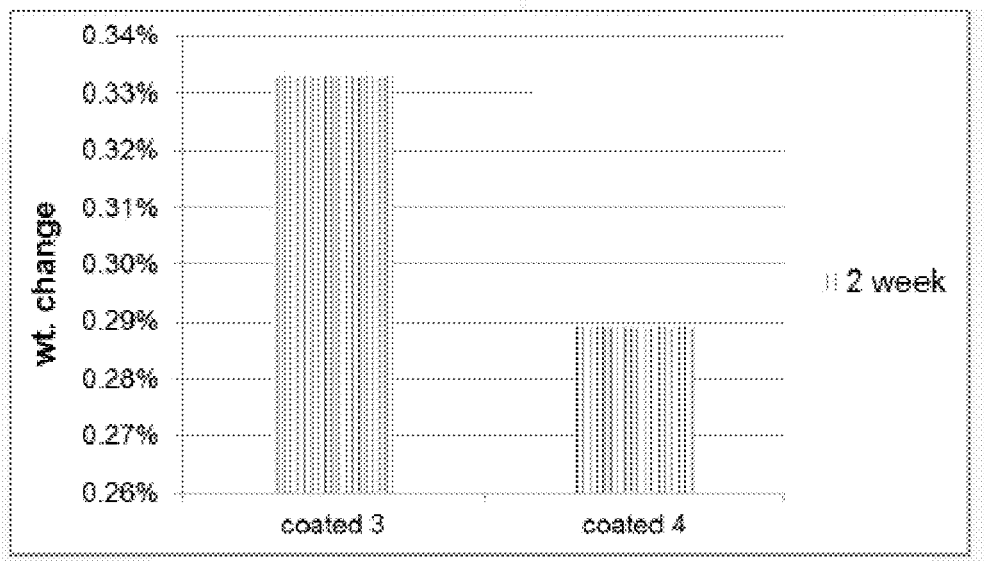
FIG. 2 shows the weight percent changes of glass filled PEEK samples coated with a fluorinated poly-para-xylylene coating after exposing to 18.5 ppg HYCAL III (zinc bromide/calcium bromide, pH=2.65) at 500° F. for two weeks.

FIG. 1 compares the weight percent changes of uncoated glass filled polyetheretherketone (PEEK) samples with weight percent changes of coated glass filled PEEK samples having a fluorinated poly-para-xylylene coating after aging tests. The coated and uncoated samples were exposed to 19.2 pounds per gallon (ppg) of HYCAL III (zinc bromide/calcium bromide, pH=1.42) at 500° F. for one or two weeks. HYCAL III contains zinc bromide, or calcium bromide, or a combination thereof. The results indicate that the weights of uncoated samples changed about 2 wt. % after aging whereas the weights of coated samples changed less than 0.5 wt. % after aging. In addition, discoloration of uncoated samples was observed after the aging tests. The color of coated samples did not change after aging. FIG. 2 shows the weight percent changes of glass filled PEEK samples coated with a fluorinated poly-para-xylylene coating after exposing to 18.5 ppg of HYCAL III (zinc bromide/calcium bromide, pH=2.65) at 500° F. for two weeks. One coated sample had a weight percent change of about 0.33 wt. % and another sample had a weight percent change of about 0.29 wt. %, both of which are minimal indicating that fluorinated poly-para-xylylene coating has excellent resistance to heavy brines in a highly acidic environment.

Figure 3:
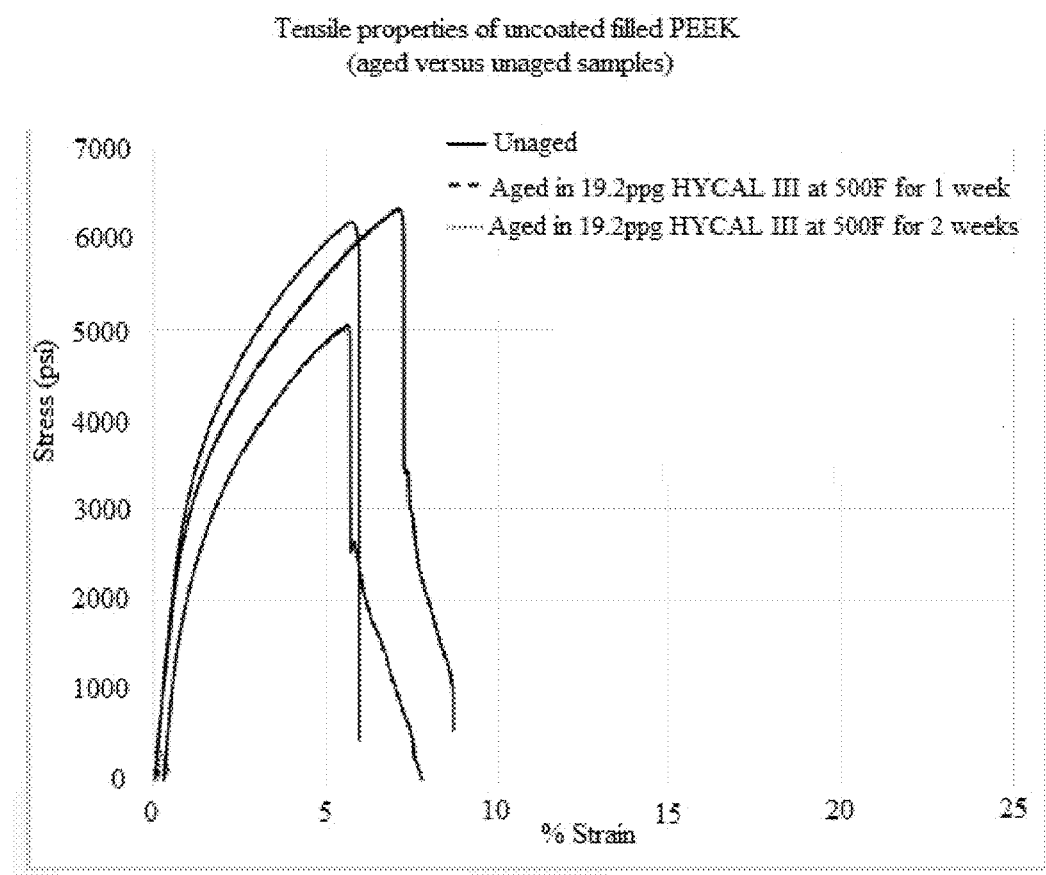
FIG. 3 shows stress-strain curves of uncoated glass filled PEEK samples (ASTM D638 type V tensile bars) aged in 19.2 ppg of HYCAL III (zinc bromide/calcium bromide, pH=1.42) at 500° F. for one or two weeks.
Figure 4:
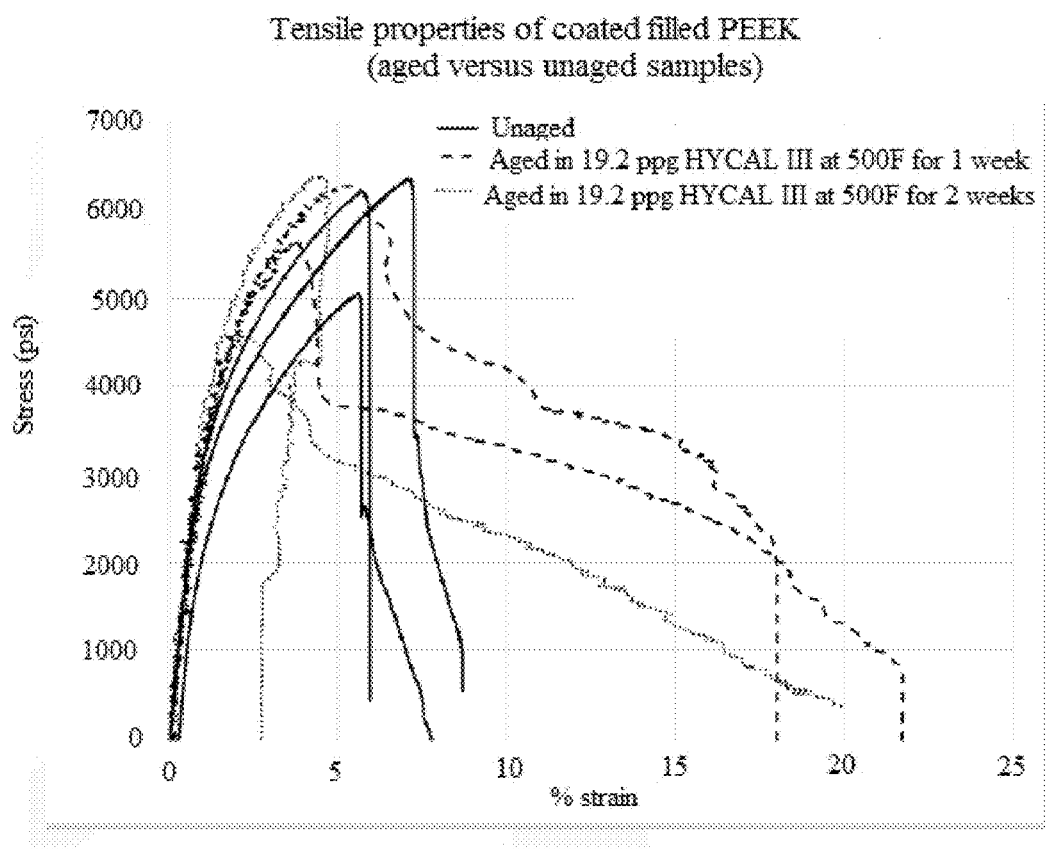
FIG. 4 shows stress-strain curves of coated glass filled PEEK samples (ASTM D638 type V tensile bars) either unaged or aged in 19.2 ppg of HYCAL III (zinc bromide/calcium bromide, pH=1.42) at 500° F. for one or two weeks, wherein all the samples have a fluorinated poly-para-xylylene coating.

Tensile properties of coated and uncoated samples are investigated. The tests were conducted according to ASTM D638 standard using ASTM Type V tensile bars. FIG. 3 shows stress-strain curves of uncoated glass filled PEEK samples aged in 19.2 ppg of HYCAL III (zinc bromide/calcium bromide, pH=1.42) at 500° F. for one or two weeks. FIG. 4 shows stress-strain curves of coated glass filled PEEK samples either unaged or aged in 19.2 ppg of HYCAL III (zinc bromide/calcium bromide, pH=1.42) at 500° F. for one or two weeks, wherein all the samples have a fluorinated poly-para-xylylene coating. Multiple samples were tested. As shown in FIG. 3, the tensile strength of uncoated samples is significantly deteriorated after aging, as evidenced by the nature of stress-stress curves and slope. In addition, the aged uncoated samples broke as soon as they were placed in the tensile test holder due to no preservation in mechanical strength. FIG. 4 indicates that the coated samples have comparable tensile strength before and after aging, as evidenced by similar nature of stress-strain curves and slope. The results indicate that a fluorinated poly-para-xylylene coating protects the polymer substrate such as glass filled PEEK from changes in tensile properties due to exposure to heavy brine and a highly acidic environment.

Figure 5A:
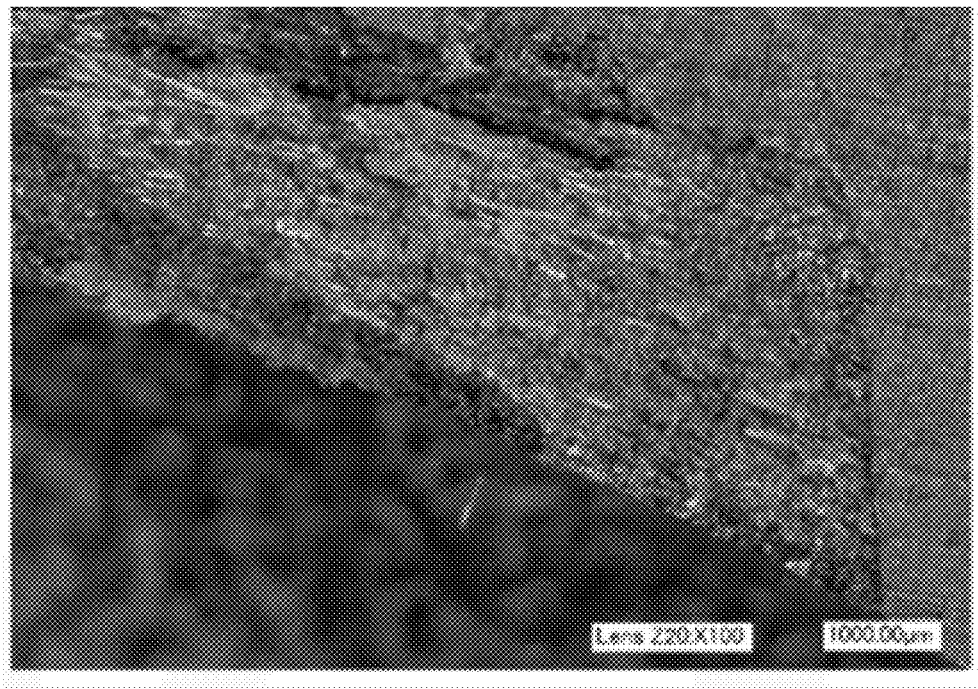
FIG. 5A and FIG. 5B are optical microscopy images of an uncoated glass filled PEEK sample after exposing to 19.2 ppg of HYCAL III (zinc bromide/calcium bromide, pH=1.42) for two weeks.
Figure 5B:
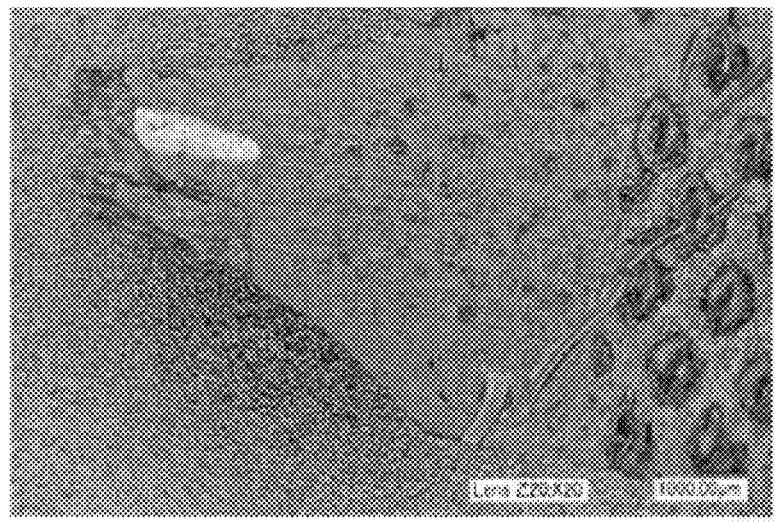
Figure 6A:
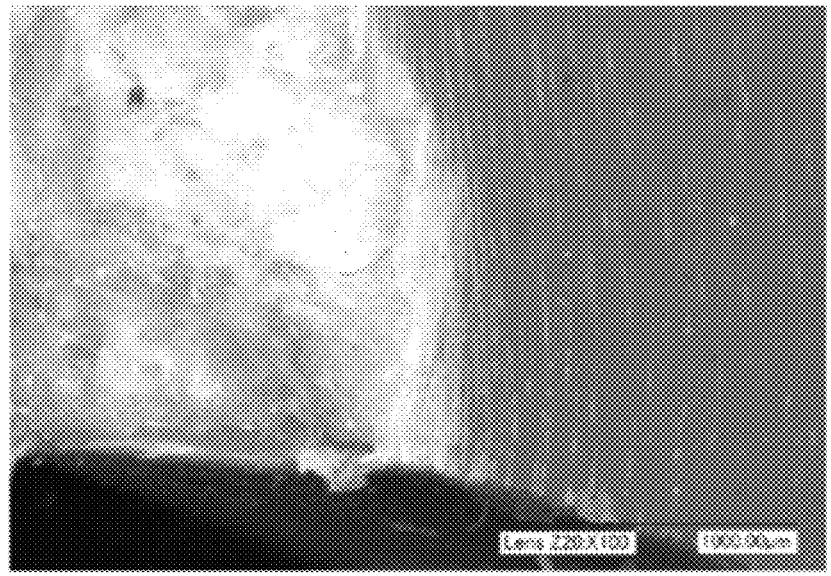
FIG. 6A and FIG. 6B are optical microscopy images of a coated glass filled PEEK sample with a fluorinated poly-para-xylylene coating after exposing to 19.2 ppg of HYCAL III (zinc bromide/calcium bromide, pH=1.42) for two weeks.
Figure 6B:
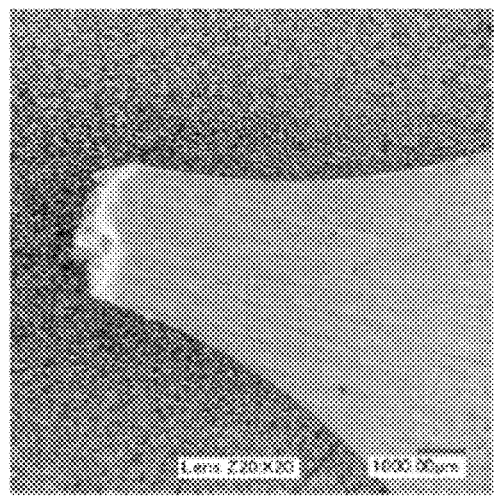

The protection of the fluorinated poly-para-xylylene coating to the polymer substrate in heavy brines is further confirmed by the optical microscopy images shown in FIGS. 5 and 6. FIG. 5A and FIG. 5B are optical microscopy images of an uncoated glass filled PEEK sample after exposing to 19.2 of HYCAL III (zinc bromide/calcium bromide, pH=1.42) for two weeks. FIG. 6A and FIG. 6B are optical microscopy images of a coated glass filled PEEK sample with a fluorinated poly-para-xylylene coating after exposing to 19.2 ppg of HYCAL III (zinc bromide/calcium bromide, pH=1.42) for two weeks. Complete degradation of polymer is observed in the uncoated samples after aging. In the coated samples, the coating is intact with some stretching observed due to tensile testing. Pristine color/nature of the coated samples indicates negligible chemical degradation of the polymer.

Figure 7:
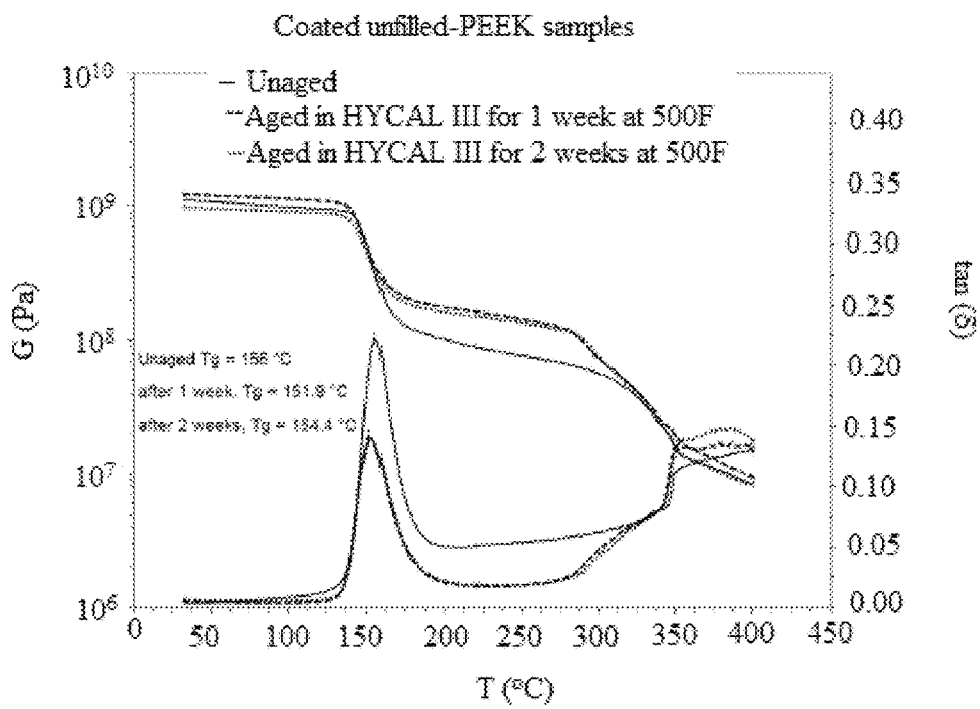
FIG. 7 shows the modulus (G') of coated unfilled PEEK samples as a function of temperature; wherein the samples are unaged or aged in 19.2 ppg of HYCAL III (zinc bromide/calcium bromide) at 500° F. for one or two weeks; and wherein all the coated PEEK samples have a fluorinated poly-para-xylylene coating.

A fluorinated poly-para-xylylene coating also provides protection to unfilled PEEK. FIG. 7 compares the modulus (G') of fluorinated poly-para-xylylene coated unfilled PEEK samples as a function of temperature; wherein the samples are unaged or aged in 19.2 of HYCAL III (zinc bromide/calcium bromide, pH=1.42) at 500° F. for one or two weeks. The insignificant changes in modulus (G') indicate the preservation of PEEK's mechanical properties after exposure to heavy brine at an elevated temperature. Melting occurs only after 350° C. The insignificant Tg shift indicates that molecular structure of the polymer is intact after aging.

Figure 8:
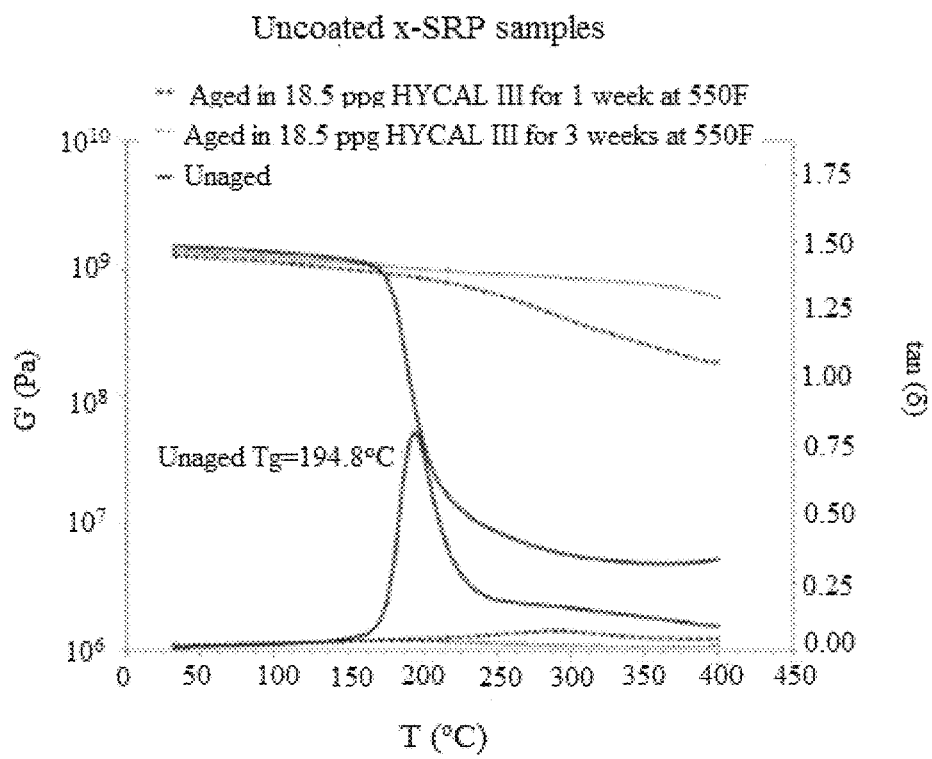
FIG. 8 shows the modulus (G') of uncoated crosslinked self-reinforced polyphenylene (x-SRP), either unaged or aged in 18.5 ppg of HYCAL III (zinc bromide/calcium bromide, pH=2.86) at 550° F. for one or two weeks.
Figure 9:
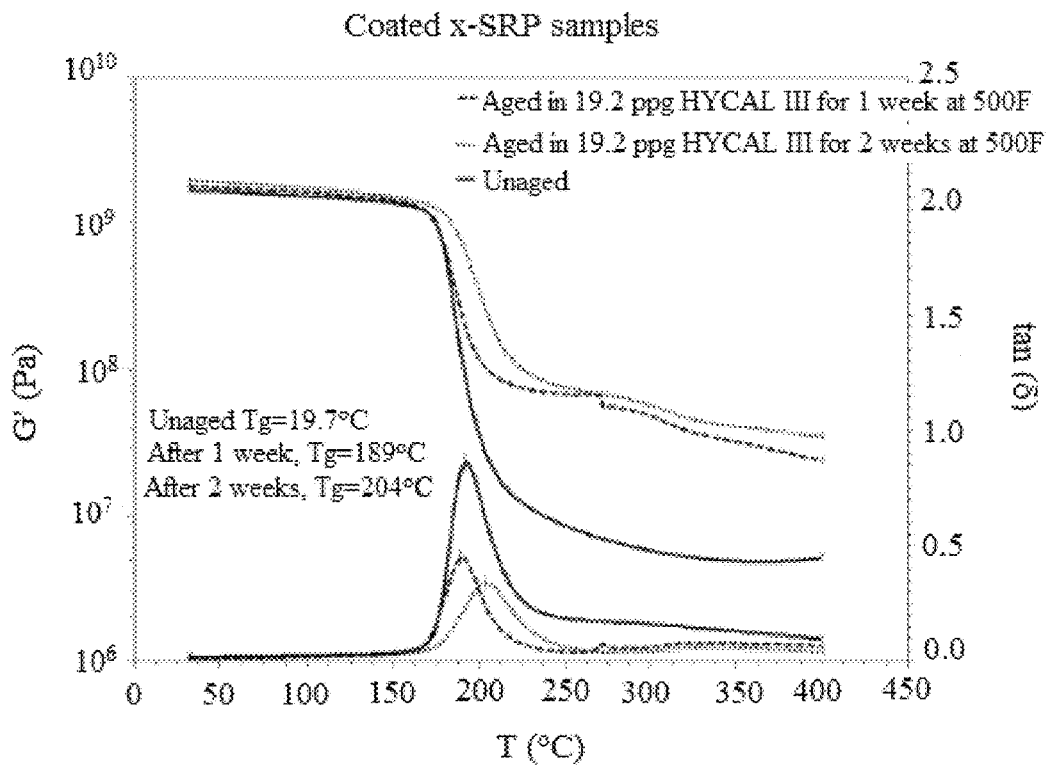
FIG. 9 shows the modulus (G') of coated x-SRP, either unaged or aged in 19.2 ppg of HYCAL III (zinc bromide/calcium bromide, pH=1.42) at 500° F. for one or two weeks; wherein all the coated samples have a fluorinated poly-para-xylylene coating.

A fluorinated poly-para-xylylene coating further provides protection to polymeric substrates other than PEEK. FIG. 8 shows the modulus (G') of uncoated crosslinked self-reinforced polyphenylene (x-SRP), either unaged or aged in 18.5 ppg of HYCAL III (zinc bromide/calcium bromide, pH=2.86) at 550° F. for one or three weeks. FIG. 9 shows the modulus (G') of coated x-SRP, either unaged or aged in 19.2 ppg of HYCAL III (zinc bromide/calcium bromide, pH=1.42) at 500° F. for one or two weeks; wherein all the coated samples have a fluorinated poly-para-xylylene coating. As shown in FIGS. 8 and 9, the uncoated x-SRP does not have a glass transition temperature after the aging test indicating that there are irreversible damages or changes to the molecular structure of the polymer. In addition, after the aging test, the uncoated sample has changed from a rubbery state to a glassy state. The elastomer-like properties of unaged x-SRP are lost, and the material shatters like glass. Where the x-SRP is coated with a fluorinated poly-para-xylylene coating, Tg shift is not significant. Modulus shifts upwards but still remains in rubbery regime indicating preservation of x-SRP's elastomeric properties.

Figure 10:
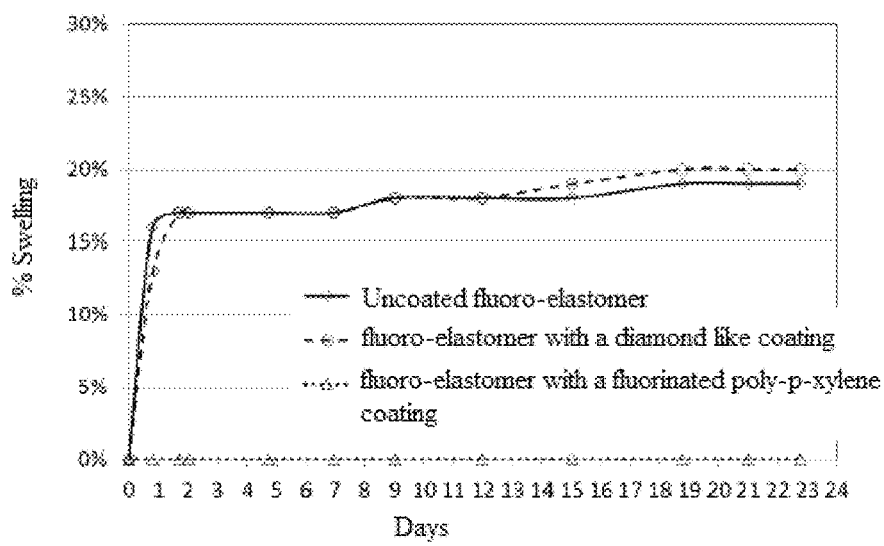
FIG. 10 compares the volume % change of an uncoated fluoro-elastomer sample, a coated fluoro-elastomer sample having a diamond like carbon coating, and a coated fluoro-elastomer sample having a fluorinated poly-para-xylylene coating as a function of aging time in a mineral oil at 200° F.

The fluorinated poly-para-xylylene coating further provides barrier properties to hydrocarbons. FIG. 10 compares the volume % change of an uncoated fluoro-elastomer sample, a coated fluoro-elastomer sample having a diamond like carbon coating, and a coated fluoro-elastomer sample having a fluorinated poly-para-xylylene coating as a function of aging time in a mineral oil at 200° F. The mineral oil tested contains lighter fractions of petroleum distillate. A fluoro-elastomer swells in a hydrocarbon-based solvent. A diamond like carbon coated fluoro-elastomer shows comparable swelling or fluid penetration as the uncoated coated indicating that the diamond like carbon is not a good barrier to hydrocarbons. No swelling is observed with fluorinated poly-para-xylylene coated samples after three weeks of exposure indicating that fluorinated poly-para-xylylene provides excellent barrier properties to a polymeric substrate against hydrocarbons.

The fluorinated poly-para-xylylene also improves the scratch resistance of a polymeric substrate. Scratch hardness are tested according to ASTM D7027. Scratch testing was performed on a micro-scratch tester (CSM Instruments) using a diamond tip Rockwell indenter with a radius of 100 µm. The samples tested were not aged or subjected to fluid exposure prior to testing. The samples were subjected to a progressively increasing load in the range of 50 mN to 10,000 mN with a rate of 19,900 mN/min. The penetration depth of the indenter was monitored for any slope change, which would be associated with failure. This was defined as critical load and was used to calculate scratch hardness of a substrate. The critical load for uncoated filled PEEK was measure to be about 6438 mN. The scratch width was also measured at this critical load, which was 46 µm. The critical load for the fluorinated poly-para-xylylene coated filled PEEK was about 7650 mN and scratch width was 70 μm. Using the equation shown below, the coated sample was calculated to be twice as hard as the uncoated sample: Hs=4qP/πw², where w is the scratch width in millimeters, p is the normal load in Newtons, and q is a dimensionless parameter that depends on the extent of elastic recovery of the polymer during scratching. Thus, in an embodiment, the ratio of the scratch hardness of a fluorinated poly-para-xylylene coated sample versus uncoated sample is about 2, determined according to ASTM D7027.

Figure 11:
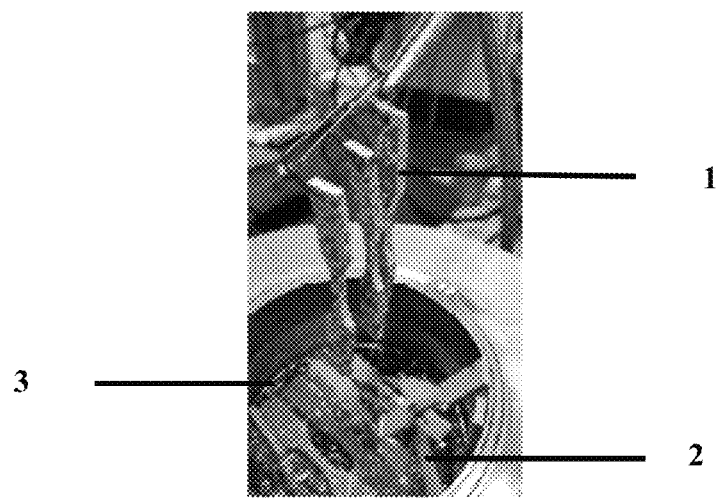
FIG. 11 is a picture of PEEK samples with a fluorinated poly-para-xylylene coating or a ceramic sol/gel coating after aging in 19.2 ppg of HYCAL III (zinc bromide/calcium bromide, pH=1.42) at 500° F. for two weeks.
Figure 12:
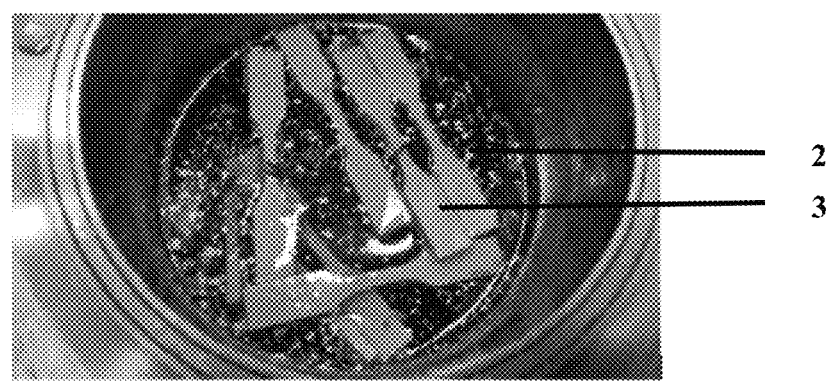
FIG. 12 is a picture of PEEK samples having a fluorinated poly-para-xylylene coating after exposing to 19.2 ppg of HYCAL III (zinc bromide/calcium bromide, pH=1.42) at 500° F. for two weeks.

Fluorinated poly-para-xylylene coated articles are particularly suitable for use in downhole applications, where the downhole articles are often exposed to heavy brines, hydrocarbons, acidic conditions at elevated temperatures. The results are surprising because not all the high temperature and high chemical resistant coatings are suitable for downhole applications. Ceramic/sol-gel type coatings are known high temperature, high chemical resistant, and high corrosion resistant coatings. FIG. 11 is a picture of PEEK samples with a fluorinated poly-para-xylylene coating or a ceramic sol/gel coating after aging in 19.2 ppg of HYCAL III (zinc bromide/calcium bromide, pH=1.42) at 500° F. for two weeks. FIG. 12 is a picture of PEEK samples having a fluorinated poly-para-xylylene coating after exposing to 19.2 ppg of HYCAL III (zinc bromide/calcium bromide, pH=1.42) at 500° F. for two weeks. The coatings on the ceramic/sol-gel coated samples (1) are disintegrated leaving samples unprotected from chemical attack. The particles (3) floating in the zinc bromide solution are remnants of the ceramic/so-gel coatings. Under the same aging conditions, coatings on the fluorinated poly-para-xylylene coated samples (2) are intact and continue to provide protection to the polymer after aging.

The downhole articles comprising the fluorinated poly-para-xylylene coating can be a single component article. In an embodiment, the downhole articles inhibit flow. In another embodiment, the downhole articles are pumpable within a downhole environment.

Illustrative articles that inhibit flow include seals, compression packing elements, expandable packing elements, O-rings, bonded seals, bullet seals, sub-surface safety valve seals, sub-surface safety valve flapper seal, dynamic seals, V-rings, back up rings, drill bit seals, electric submersible pump seals.

Illustrative articles that are pumpable within a downhole environment include plugs, bridge plugs, wiper plugs, frac plugs, components of frac plugs, polymeric plugs, disappearing wiper plugs, cementing plugs, swabbing element protectors, buoyant recorders, pumpable collets.

In an embodiment, the element is a packer element, a blowout preventer element, a submersible pump motor protector bag, a sensor protector, a sucker rod, an O-ring, a T-ring, a gasket, a sucker rod seal, a pump shaft seal, a tube seal, a valve seal, a seal for an electrical component, an insulator for an electrical component, a seal for a drilling motor, a seal for a drilling bit, or porous media such as a sand filter, or other downhole elements.

In a specific embodiment, the downhole article is backup ring having a fluorinated poly-para-xylylene.

The fluorinated poly-para-xylylene coating provides protection to the article from a downhole environment. A method of protecting an article from a downhole environment comprises depositing a fluorinated poly-para-xylylene coating on a surface of a polymer substrate to provide a coated article; the surface of the polymer substrate configured for exposure to a well fluid; and the polymer substrate comprising a thermoplastic material, an elastomer, or a combination comprising at least one of the foregoing; wherein the downhole environment comprises one or more of the following: a brine; a hydrocarbon; or an elevated temperature up to about 670° F., up to about 650° F., or up to about 600° F. The method can further comprise exposing the coated article to the downhole environment.

The brine includes monovalent cations, polyvalent cations, or a combination comprising at least one of the foregoing. The polyvalent cations in the brine can be Mg²⁺, Ca²⁺, Zn²⁺, or a combination comprising at least one of the foregoing. In an embodiment, the brine comprises greater than about 5 ppg, greater than about 10 ppg or greater than about 15 ppg of polyvalent salts. Exemplary polyvalent salts include zinc bromide, zinc chloride, calcium bromide, calcium chloride, magnesium chloride, and the like. Combinations of polyvalent salts can be present in the brine.

In an embodiment, the method can further comprise exposing the coated article to a brine at a temperature of greater than about 100° F. to less than about 670° F. or greater than 300° F. to less than about 670° F. The brine can be acidic, basic, or neutral. Advantageously, the coating protects the substrate from acidic brines having a pH of less than about 6, less than about 5, less than about 4, or less than about 3. In another embodiment, the method further comprises exposing the coated article to a hydrocarbon at a temperature of greater than about 100° F. to less than about 670° F. or at a temperature of greater than about 100° F. to less than about 670° F., or at a temperature of greater than about 300° F. and less than about 670° F.

Further included in this disclosure are the following specific embodiments, which do not necessarily limit the claims.

Embodiment 1

A Downhole article comprising
a polymer substrate having a surface that is configured for exposure to a well fluid; the polymer substrate comprising a thermoplastic material, an elastomer, or a combination comprising at least one of the foregoing; and
a coating disposed on the surface of the polymer substrate; the coating comprising a fluorinated poly-para-xylylene.

Embodiment 2

The article of Embodiment 1, wherein the coating comprises:

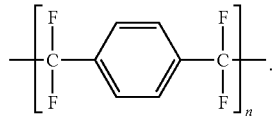

Embodiment 3

The article of Embodiment 1 or Embodiment 2, wherein the coating has a thickness of about 5 μm to about 10 mm.

Embodiment 4

The article of any one of Embodiments 1 to 3, wherein the polymer substrate comprises one or more of the following:

a polyaryletherketone; a fluoropolymer; a polyarylene sulfide; a polyarylene; a polyarylene sulfone; a polyether sulfone; a polyarylene ether; a polyuria; a polyurethane; a polycarbonate; a polyimide; an ethylene-propylene-diene monomer rubber; a butadiene rubber; a styrene-butadiene rubber; a natural rubber; an acrylonitrile butadiene rubber; a styrene-butadiene-acrylonitrile; a butadiene-nitrile rubber; a polyisoprene rubber; an acrylate-butadiene rubber; a polychloroprene rubber; an acrylate-isoprene rubber; an ethylene-vinyl acetate rubber; a polypropylene oxide rubber; or a crosslinked product thereof.

Embodiment 5

The article of any one of Embodiments 1 to 4, wherein the polymer substrate comprises one or more of the following: a polyetheretherketones; a fluoropolymer; or a crosslinked self-reinforced polyphenylene.

Embodiment 6

The article of any one of Embodiments 1 to 5, wherein the polymer substrate further comprises a filler.

Embodiment 7

The article of any one of Embodiments 1 to 6, wherein the downhole article is selected from seals, compression packing elements, expandable packing elements, O-rings, bonded seals, bullet seals, sub-surface safety valve seals, sub-surface safety valve flapper seal, dynamic seals, V-rings, back up rings, drill bit seals, and electric submersible pump seals; bridge plugs, wiper plugs, frac plugs, components of frac plugs, polymeric plugs, disappearing wiper plugs, cementing plugs, swabbing element protectors, buoyant recorders, and pumpable collets.

Embodiment 8

The article of Embodiment 7, wherein the article is a backup ring.

Embodiment 9

A method of protecting an article from a downhole environment, the method comprising:
depositing a fluorinated poly-para-xylylene coating on a surface of a polymer substrate to provide a coated article; the surface of the polymer substrate configured for exposure to a well fluid; and the polymer substrate comprising a thermoplastic material, an elastomer, or a combination comprising at least one of the foregoing;
wherein the downhole environment comprises one or more of the following: a brine; a hydrocarbon; or an elevated temperature up to about 670° F.

Embodiment 10

The method of Embodiment 9 further comprising exposing the coated article to a brine at a temperature of greater than about 100° F. to less than about 670° F.

Embodiment 11

The method of Embodiment 9 further comprising exposing the coated article to a brine at a temperature of greater than about 300° F. to less than about 670° F.

Embodiment 12

The method of any one of Embodiments 9 to 11, wherein the brine is acidic.

Embodiment 13

The method of any one of Embodiment 9 to 11, wherein the brine is basic or neutral.

Embodiment 14

The method of any one of Embodiments 9 to 13 further comprising exposing the coated article to a hydrocarbon at a temperature of greater than about 100° F. to less than about 670° F.

Embodiment 15

The method of any one of Embodiments 9 to 13, wherein the coating comprises:

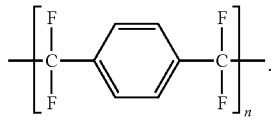

Embodiment 16

The method of any one of Embodiments 9 to 15, wherein the coating has a thickness of about 5 μm to about 10 mm.

Embodiment 17

The method of any one of Embodiments 9 to 16, wherein the polymer substrate comprises one or more of the following: a polyaryletherketone; a fluoropolymer; a polyarylene sulfide; a polyarylene; a polyarylene sulfone; a polyether sulfone; a polyarylene ether; a polyuria; a polyurethane; a polycarbonate; a polyimide; an ethylene-propylene-diene monomer rubber; a butadiene rubber; a styrene-butadiene rubber; a natural rubber; an acrylonitrile butadiene rubber; a styrene-butadiene-acrylonitrile; a butadiene-nitrile rubber; a polyisoprene rubber; an acrylate-butadiene rubber; a polychloroprene rubber; an acrylate-isoprene rubber; an ethylene-vinyl acetate rubber; a polypropylene oxide rubber; or a crosslinked product thereof.

Embodiment 18

The method of any one of Embodiments 9 to 17, wherein the polymer substrate comprises one or more of the following: a polyetheretherketones; a fluoropolymer; or a crosslinked self-reinforced polyphenylene.

Embodiment 19

The method of any one of Embodiments 9 to 18, wherein the polymer substrate further comprises a filler.

Embodiment 20

The method of any one of Embodiments 9 to 19, wherein the coated article is selected from seals, compression packing elements, expandable packing elements, O-rings, bonded seals, bullet seals, sub-surface safety valve seals, sub-surface safety valve flapper seal, dynamic seals, V-rings, back up rings, drill bit seals, and electric submersible pump seals; bridge plugs, wiper plugs, frac plugs, components of frac plugs, polymeric plugs, disappearing wiper plugs, cementing plugs, swabbing element protectors, buoyant recorders, and pumpable collets.

All ranges disclosed herein are inclusive of the endpoints, and the endpoints are independently combinable with each other. As used herein, "combination" is inclusive of blends, mixtures, alloys, reaction products, and the like. All references are incorporated herein by reference.

The use of the terms "a" and "an" and "the" and similar referents in the context of describing the invention (especially in the context of the following claims) are to be construed to cover both the singular and the plural, unless otherwise indicated herein or clearly contradicted by context. "Or" means "and/or." Further, it should further be noted that the terms "first," "second," and the like herein do not denote any order, quantity (such that more than one, two, or more than two of an element can be present), or importance, but rather are used to distinguish one element from another. The modifier "about" used in connection with a quantity is inclusive of the stated value and has the meaning dictated by the context (e.g., it includes the degree of error associated with measurement of the particular quantity). Unless defined otherwise, technical and scientific terms used herein have the same meaning as is commonly understood by one of skill in the art to which this invention belongs. As used herein, the size or average size of the particles refers to the largest dimension of the particles and can be determined by high resolution electron or atomic force microscope technology.

All references cited herein are incorporated by reference in their entirety. While typical embodiments have been set forth for the purpose of illustration, the foregoing descriptions should not be deemed to be a limitation on the scope herein. Accordingly, various modifications, adaptations, and alternatives can occur to one skilled in the art without departing from the spirit and scope herein.

What is claimed is:

1. A downhole article comprising
a polymer substrate having a surface that is configured for exposure to a well fluid comprising an acidic brine comprising greater than 5 ppg of a polyvalent salt, which comprise one or more of the following: zinc bromide; zinc chloride; calcium bromide; calcium chloride; or magnesium chloride, at a temperature of greater than 100° F. to less than 670° F.; and
a coating disposed on the surface of the polymer substrate, wherein the polymer substrate comprises a crosslinked self-reinforced polyphenylene;
the coating comprises a fluorinated poly-para-xylylene and has a thickness of 10 micrometer to 0.1 millimeter; and
the article is a backup ring.

2. The article of claim 1, wherein the coating comprises:

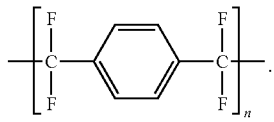

3. The article of claim 1, wherein the substrate further comprises 0.1 wt % to 15 wt % of a reinforcing additive, a non-reinforcing additive, or a combination thereof.

4. The downhole article of claim 1, wherein the substrate comprises 0.1 to 25 wt % of glass based on the total weight of the substrate.

5. The downhole article of claim 1, wherein the substrate comprises 0.1 to 5 wt % of glass based on the total weight of the substrate.

6. A method of protecting the article of claim 1 from a downhole environment, the method comprising:
providing the downhole article of claim 1 by depositing the fluorinated poly-para-xylylene coating having a thickness of 10 micrometers to 0.1 millimeter on the surface of the polymer substrate; the surface of the polymer substrate configured for exposure to the well fluid comprising the acidic brine at a temperature of greater than 100° F. to less than 670° F.; and the polymer substrate comprising the crosslinked self-reinforced polyphenylene; and
exposing the downhole article in the acidic brine which contains greater than 5 ppg of the polyvalent salt comprising one or more of the following: zinc bromide; zinc chloride; calcium bromide; calcium chloride; or magnesium chloride at a temperature of greater than 100° F. to less than 670° F.;
wherein the article is a backup ring.

7. The method of claim 6 wherein the downhole article is exposed to the brine at a temperature of greater than 300° F. to less than 670° F.

8. The method of claim 6, wherein the brine is acidic with a pH of less than 4 and comprises greater than 5 ppg of the polyvalent salt, which comprises zinc bromide and calcium bromide.

9. The method of claim 8, wherein the brine comprises greater than 10 ppg of the polyvalent salt.

10. The method of claim 6 further comprising exposing the downhole article to a hydrocarbon at a temperature of greater than 100° F. to less than 670° F.

11. The method of claim 6, wherein the coating comprises:

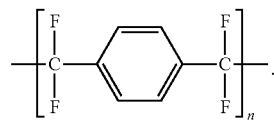

12. The method of claim 6, wherein the polymer substrate further comprises a filler comprising glass.

13. The method of claim 6, wherein the brine is acidic with a pH of less than 3 and contains greater than 10 ppg of zinc bromide; calcium bromide; or a combination thereof.

14. The method of claim 6, wherein the substrate comprises 0.1 to 5 wt % of glass based on the total weight of the substrate.

* * * * *